United States Patent [19]
Shaw

[11] Patent Number: 6,106,052
[45] Date of Patent: Aug. 22, 2000

[54] DETACHABLE ANCHOR FOR CAMPERS

[76] Inventor: Jeff Shaw, 13985 Sycamore Way, Chino, Calif. 91710-7017

[21] Appl. No.: 09/219,568

[22] Filed: Dec. 22, 1998

[51] Int. Cl.$^7$ .................................................. B60P 3/377
[52] U.S. Cl. ..................................... 296/167; 248/222.41
[58] Field of Search .................................. 296/167, 35.1, 296/35.3; 248/222.41, 223.21, 499, 503, 506; 410/100, 101, 106

[56] References Cited

U.S. PATENT DOCUMENTS

| | | | |
|---|---|---|---|
| 1,660,474 | 2/1928 | Bruckel | 248/222.41 |
| 2,038,279 | 4/1936 | Giertsen | 248/222.41 |
| 2,192,392 | 3/1940 | Woodward | 248/222.41 |
| 2,253,649 | 8/1941 | Price | 248/222.41 |
| 3,486,785 | 12/1969 | Corson | 296/167 |
| 3,489,454 | 1/1970 | Manteufel | 296/167 |
| 3,549,194 | 12/1970 | Matson | 296/167 |
| 3,635,366 | 1/1972 | Dodgen | 296/167 |
| 3,744,840 | 7/1973 | Van Cleave | 296/167 |
| 3,781,057 | 12/1973 | Manuel | 296/167 |
| 3,792,900 | 2/1974 | Bugh | 296/167 |
| 3,814,460 | 6/1974 | Norrish | 296/167 |
| 3,837,701 | 9/1974 | Curtis et al. | 296/167 |
| 3,990,736 | 11/1976 | Baumer | 296/167 |
| 4,103,959 | 8/1978 | Whiting et al. | 296/167 |
| 4,784,046 | 11/1988 | Gautier | 248/222.41 |
| 4,893,777 | 1/1990 | Gassaway | 248/223.21 |
| 5,769,191 | 6/1998 | Cole, Jr. et al. | 296/167 |

*Primary Examiner*—Joseph D. Pape
*Assistant Examiner*—Kiran Patel
*Attorney, Agent, or Firm*—Christie, Parker & Hale, LLP

[57] ABSTRACT

A detachable anchor for attaching a camper to a pickup truck. The detachable anchor has a mounting plate portion for attachment to a pickup truck and a detachable turnbuckle portion. The mounting plate portion is attached to the front wall of the bed of the pickup truck. The mounting plate portion has a pair of protrusions with enlarged heads and narrower necks. The detachable turnbuckle portion has a pair of apertures with wider ends and narrower ends with the wider ends of the apertures being adapted to receive the enlarged head and the narrower ends of the apertures being adapted to retain the heads. The detachable turnbuckle portion has a wing region that extends beyond the sidewalls of the bed and has an aperture to attach to a turnbuckle. When not in use, the detachable turnbuckle portion can be removed from the mounting plate portion attached to the truck.

7 Claims, 5 Drawing Sheets

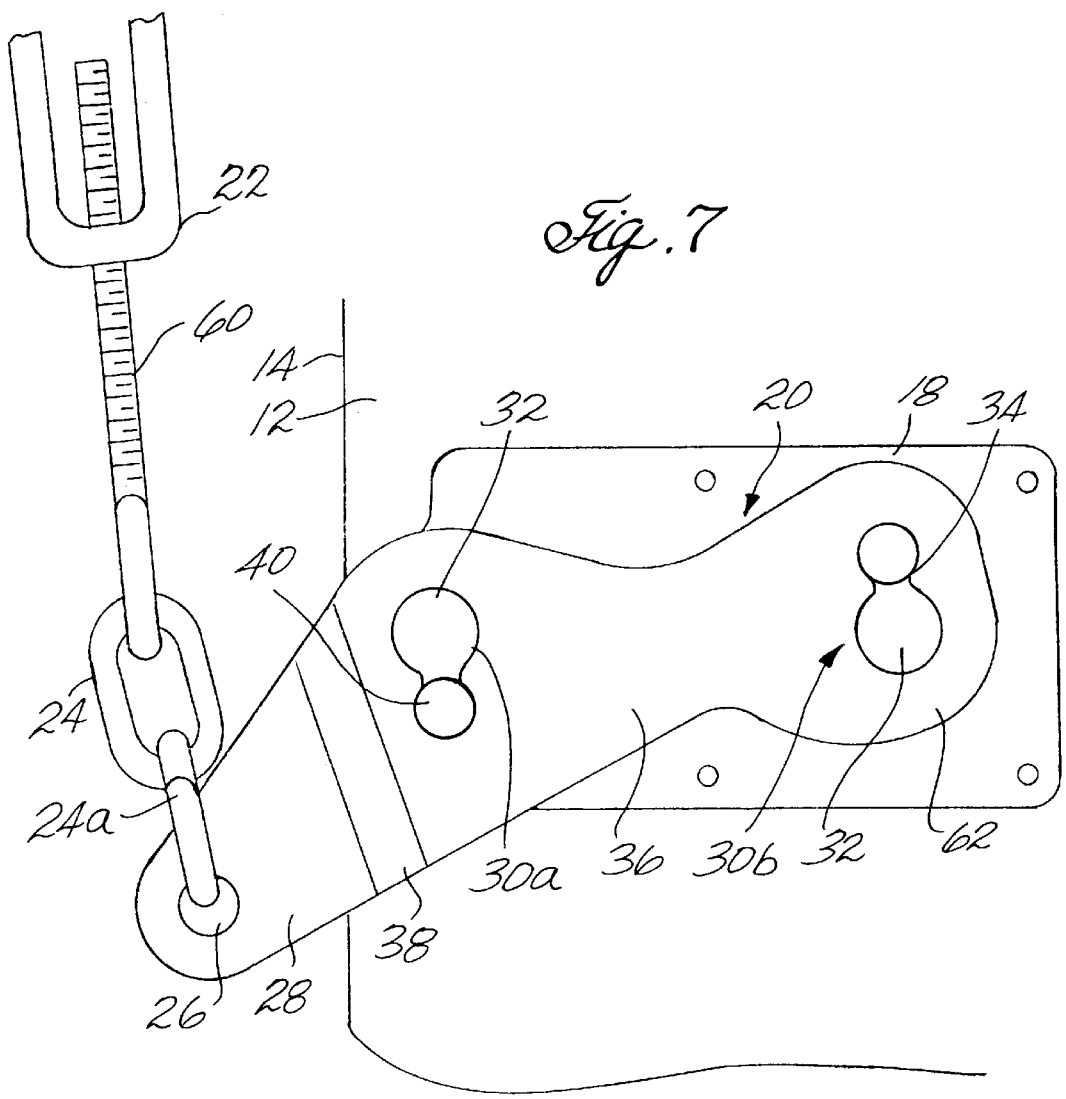
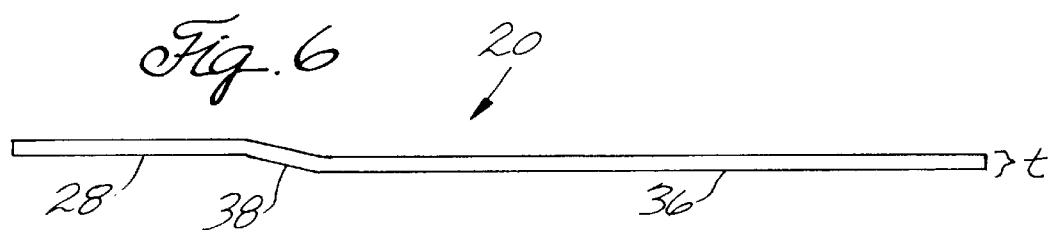

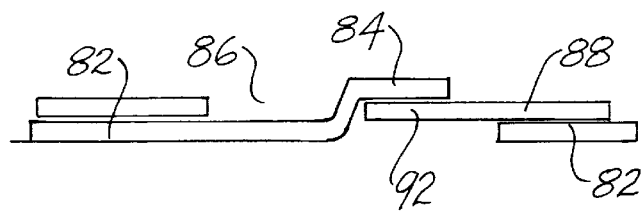
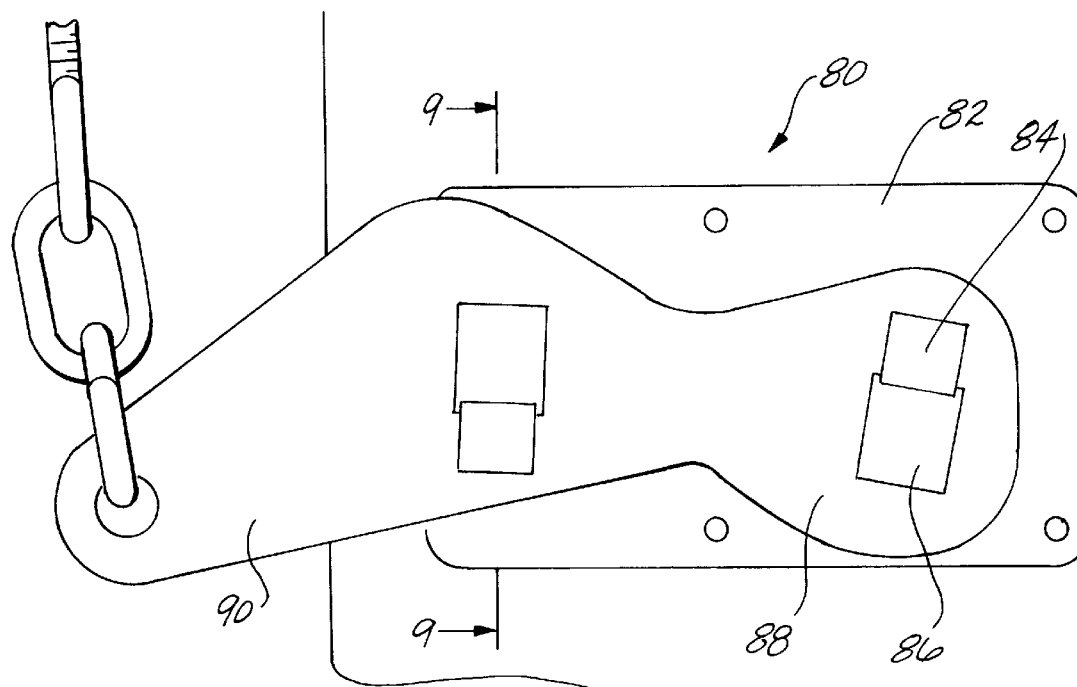

DETACHABLE ANCHOR FOR CAMPERS

BACKGROUND OF THE INVENTION

1. Field of the Invention

This invention relates to the field of campers, and more particularly a detachable anchor for use in securing a camper to a truck with tumbuckles and similar tensioning mechanisms.

BACKGROUND OF THE INVENTION

2. Description of the Prior Art

Recreational vehicles, including campers, are very popular in the United States. There are presently about 9 million recreational vehicles in the United States. Campers account for a sizable percentage of this number and remain very popular due to their ability to be detached from the bed of a truck when not in use. Indeed, for those who do not require a large recreational vehicle, campers remain the choice of many.

Campers are designed to sit on the bed of a pickup truck and have a cab over portion extending over the truck's cab. Tumbuckles are typically used to secure the camper to the pickup truck since they allow cinching down of the camper relative to the truck bed. These tumbuckles are attached at one end to various points on the camper and attach at other ends to eyebolts, plates, or brackets mounted to the truck. Typically, a pair of tumbuckles secures the front and a pair of tumbuckles secures the rear of a camper. Shock absorbers are often used between the truck's cab and the cab over part of the camper to help decrease the effects of harmonic road vibrations.

In most modern camper applications, sturdy brackets having turnbuckle attachment holes are permanently attached to the front side of the truck bed between the truck bed and the pickup cab to hold down the front of the camper to the truck. Other brackets attached to the rear of the truck (e.g. on the bumper) are used for holding down the back region of the camper. In these prior art brackets, a pair of single piece brackets are normally permanently bolted in place to the front side of the truck bed between the bed and the pickup's cab with a portion of the bracket having the turnbuckle attachment hole extending beyond the two sides of the truck bed. These extensions beyond the sides of the pickup are necessary so that the turnbuckle can be connected to the bracket. U.S. Pat. No. 4,103,959 to Whiting et al. discloses such a style of hold down bracket for campers that is designed to be permanently attached to the front wall of the truck bed between the bed and the cab.

There are two major shortcomings with this prior art style of bracket. First, these brackets are noticeable when the truck is used without the camper. Pride of ownership runs deep with many truck owners and they dislike the interruption in the smooth lines caused by brackets. Many truck owners have these brackets painted to match the color of their truck to try to disguise the brackets. Secondly, and from a more practical standpoint, since these brackets extend beyond the sides of the truck, those walking very close to the sides of the truck, e.g. in parking lots, risk scraping themselves on the brackets.

There accordingly remains a need for an improved bracket that solves these enumerated shortcomings with prior art brackets.

SUMMARY OF THE INVENTION

The present invention overcomes the above noted deficiencies of the presently available brackets by providing brackets that have one portion (a mounting plate portion) for permanent attachment to the truck, and a second, detachable portion (a turnbuckle plate portion) with a turnbuckle engaging hole adapted to detachably engage with the permanently mounted portion. When the truck is used without a camper, the detachable bracket portion can be easily removed thereby eliminating any unsightly protrusions extending beyond the sides of the truck.

In the invention, a mounting plate is bolted to the front of the truck bed between the bed and the cab. Preferably, threaded mounting holes are formed through the plate. The mounting plate has at least one and preferably two locking pins, each with an enlarged head and a smaller neck. The turnbuckle plate consists of plate with at least one pivot cutout having a lock end and a release end. The release end is sized to allow the head of the mounting pin to slide therethrough and the neck is slideable in the lock end. Preferably, two locking pins and two pivot cutouts are provided. An attachment hole for the turnbuckle is formed on the end of the removable turnbuckle plate.

BRIEF DESCRIPTION OF THE DRAWINGS

FIG. 6 is side view through view lines 6—6 of FIG. 5.

FIG. 7 is a top plan view of the detachable anchor for campers of FIG. 1 but showing the turnbuckle plate portion in a engagement position relative to the mounting plate portion and connected to chain links and a turnbuckle.

FIG. 8 is a top plan view showing a second embodiment of a detachable anchor for campers in a locked position.

FIG. 9 is a cross-sectional view through view lines 9—9 of FIG. 8.

DESCRIPTION OF THE PREFERRED EMBODIMENT

Figure 1:
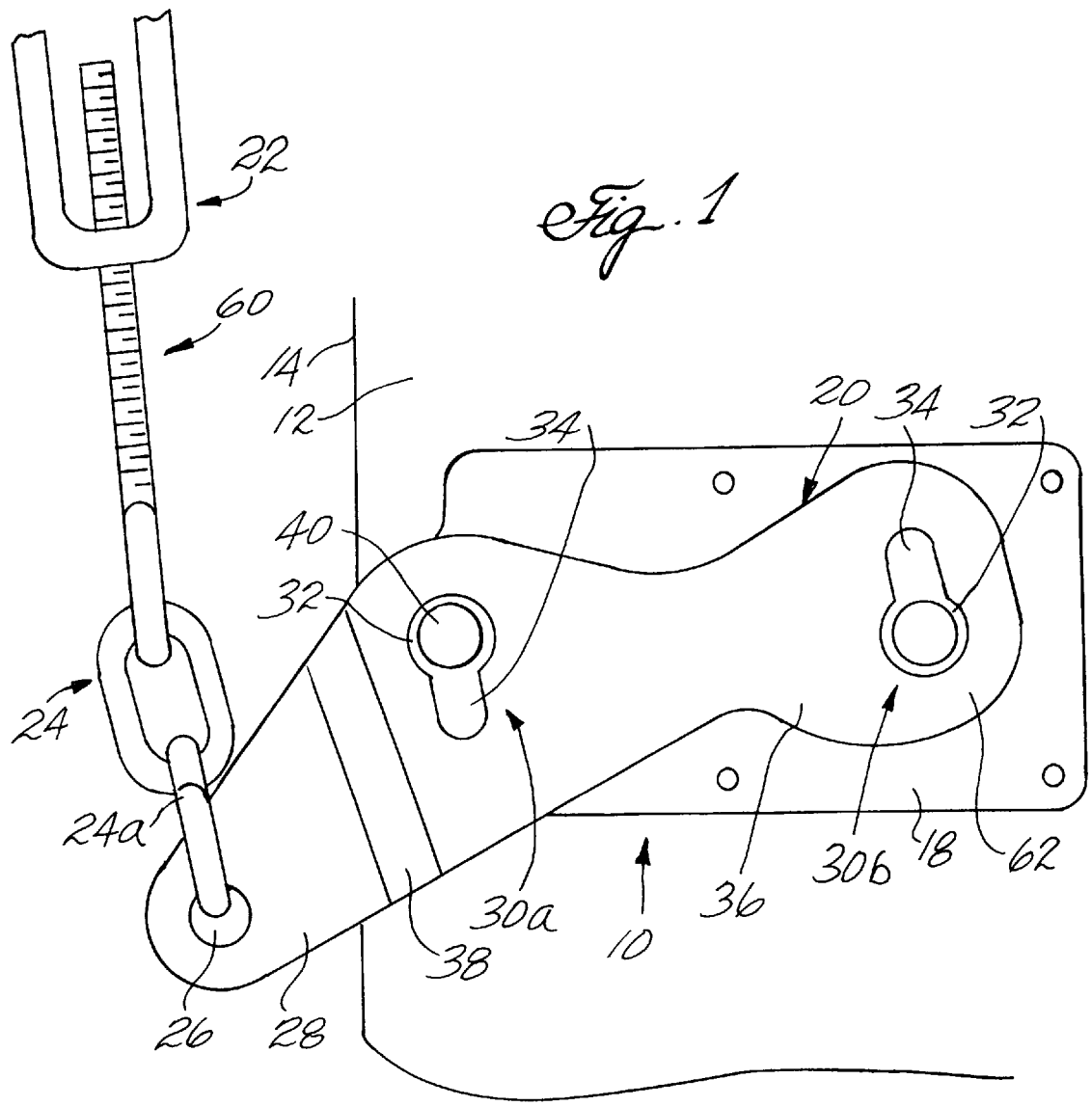
FIG. 1 is a top plan view of a detachable anchor for campers of the invention showing the turnbuckle plate portion in a release position relative to the mounting plate portion and connected to chain links and a turnbuckle.
Figure 2:
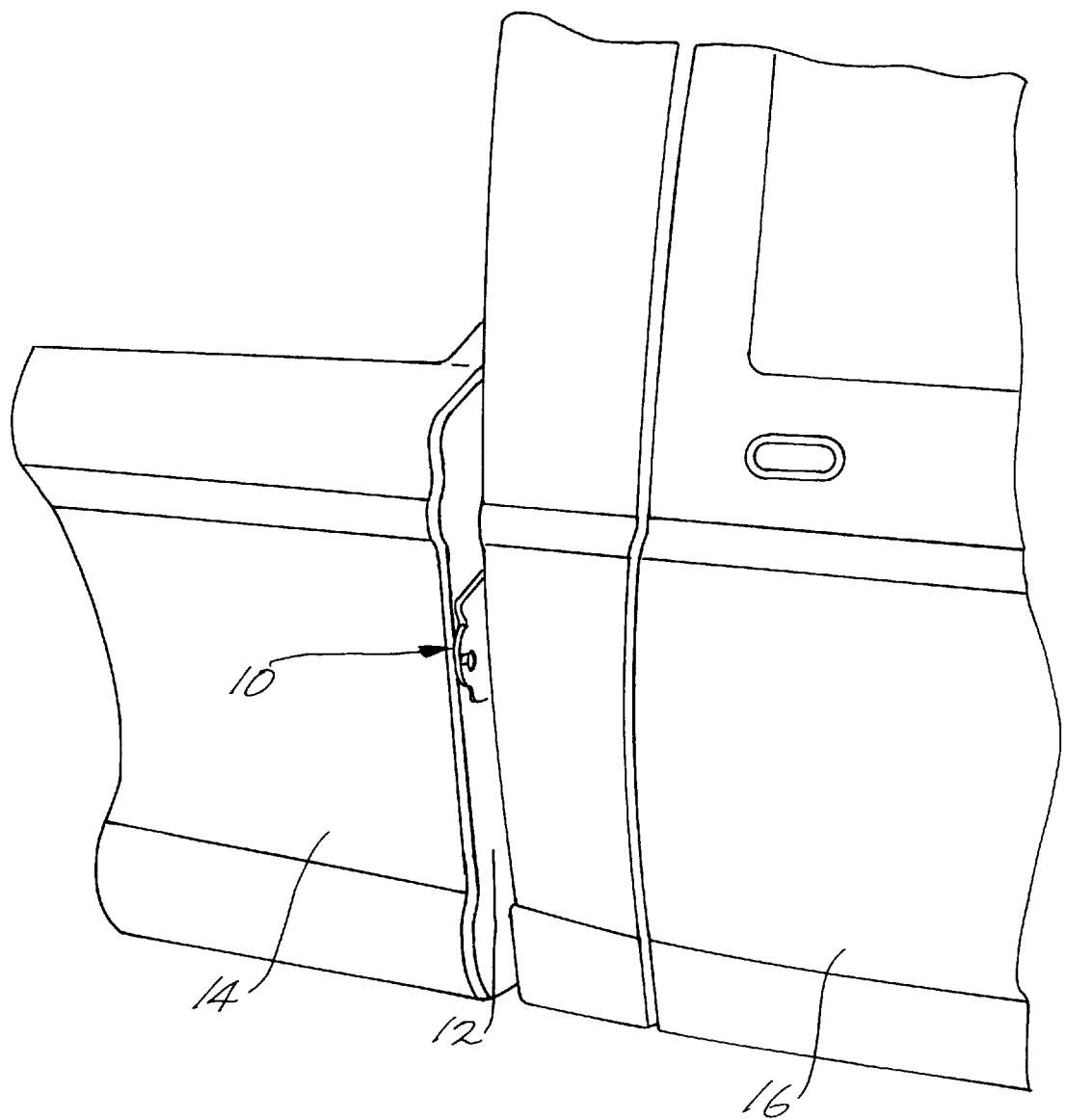
FIG. 2 is a side perspective view of the pickup truck fitted with the mounting plate portion of FIG. 1, but with the turnbuckle plate portion detached.
Figure 5:
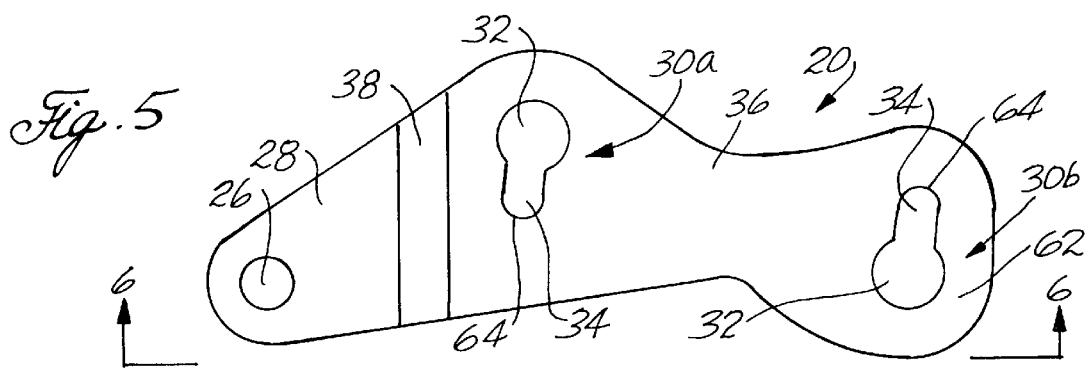
FIG. 5 is a top plan view showing the turnbuckle plate portion of FIG. 1.

Referring to FIGS. 1 and 2, a top view of detachable anchor for campers 10 is shown attached to the front wall 12 of a truck bed 14 between the truck bed 14 and the cab 16 of a vehicle, namely a pickup truck. Referring in particular to FIG. 1, the detachable anchor 10 has a mounting plate portion 18 and a detachable turnbuckle plate portion 20. Mounting plate portion 18 is bolted to the front wall 12 of the truck's bed 14. A turnbuckle 22 is attachable to detachable turnbuckle plate portion 20 as with chain links 24, with chain link 24a preferably being removably attached to a turnbuckle attachment means 26 on an extending wing region 28 of detachable turnbuckle plate portion 20. Turnbuckle attachment means 26 can comprise an aperture through which chain link 24a can be detachably attached. Referring to FIGS. 1 and 5, detachable turnbuckle plate portion 20 has plate portion engagement means 30. Plate portion engagement means 30 preferably can comprise at least one, and preferably two apertures 30a and 30b with wide ends 32 and narrow ends 34. Plate portion engagement means 30 are located on plate contacting region 36. As best shown in FIG. 6, wing region 28 and plate contacting region 36 are joined by bend portion 38 so that wing region 28 is offset away from plate contacting region 36 a distance. Detachable turnbuckle plate portion 20 preferably comprises a single piece of metal, such as high strength steel.

Turning back to FIG. 1, mounting plate portion 18 has turnbuckle plate portion engagement means 40 complementary and designed for engagement with plate portion engagement means 30. Turnbuckle plate portion engagement means 40 preferably comprises protrusions 40 adapted to engage with apertures 30.

Figure 3:
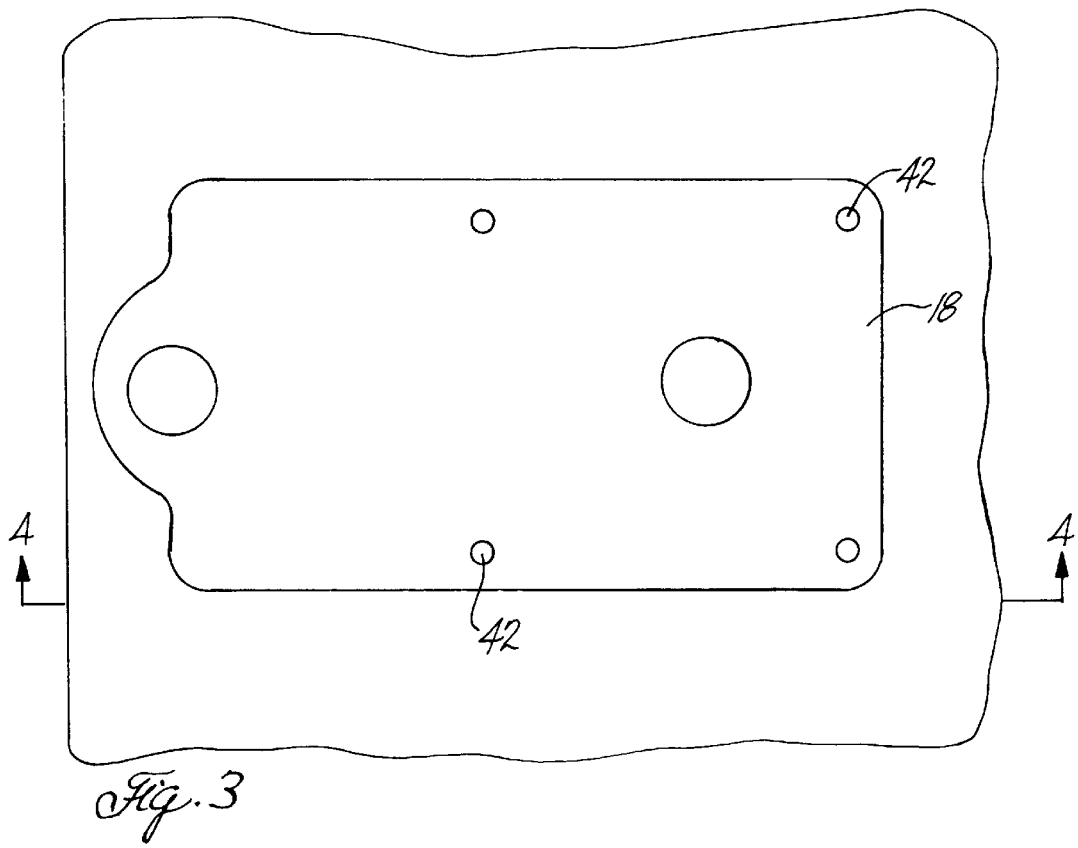
FIG. 3 is a top plan view of the mounting plate portion of FIG. 1.
Figure 4:
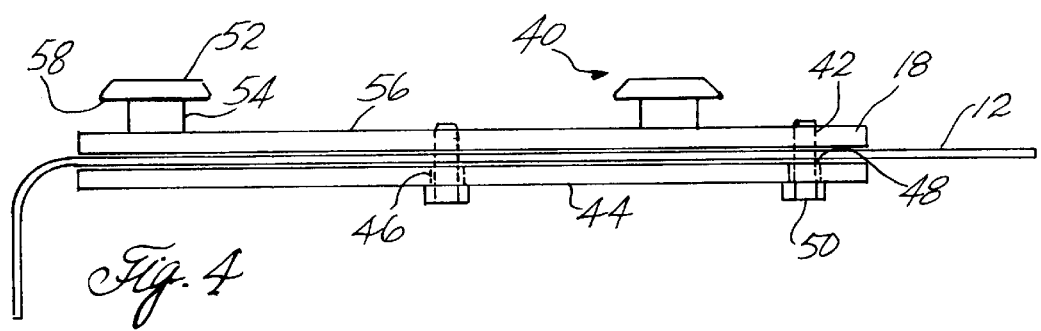
FIG. 4 is a side view of the mounting plate portion of FIG. 3 mounted to the front wall of a pickup truck with a backing plate.

Referring to FIG. 3, a top plane view of mounting plate portion 18 is shown. Mounting plate portion 18 has means to permit attachment to the vehicle. This attachment means can preferably comprise threaded bolt holes 42. Turning to FIG. 4, a side view of mounting plate portion 18 attached to front wall 12 of truck bed 14 is shown. A backing plate 44 with holes 46 is provided to render support. Holes 48 are formed in wall 12 of truck bed. Bolts 50 are passed through holes 46 and 48 and are threaded into threaded holes 42 to secure mounting plate portion 18 tightly in place. Turnbuckle plate portion engagement means 40 preferably comprise protrusion with enlarged head portion 52 and a narrower neck 54. The length of neck 54 between top 56 of mounting plate portion 20 and underside 58 of enlarged head portion 52 is slightly longer than the thickness t of detachable turnbuckle portion 20 (see FIG. 6). Viewed from the top, enlarged head portion 52 can preferably comprise a circular shape that is smaller than wider end of aperture 32 but larger than narrower end of aperture 34. Thus, as shown in FIG. 1, when detachable turnbuckle portion 20 is oriented with its wing region 28 dropped, detachable turnbuckle portion 20 is oriented such that wider ends of apertures 32 are aligned to received enlarged head 52 of mounting plate portion 18, and detachable turnbuckle portion 20 can be pushed into contact with top of mounting plate portion 56. By turning turnbuckle 22, the tumbuckle's threaded eyebolt 60 will move upwardly, and pull wing region 28 upwardly and thereby pivot detachable turnbuckle portion 20 such that narrower end of aperture 34 is moved beneath enlarged head 52. This same movement (or simply the weight of detachable turnbuckle portion 20 drops the end 62 of detachable turnbuckle portion 20 distant wing region 28) moves detachable turnbuckle portion 20 so that narrower end of aperture 34 is retained by enlarged head 52. As can be seen, aperture 30a closest to wing region 28 is oriented with its wider end 32 up, and aperture 30b closest to end 62 is oriented with its wider end 32 down. This arrangement provides for easy attachment of detachable turnbuckle portion 20 to mounting plate portion 18 (since even before the turnbuckle is turned to completely lock detachable turnbuckle portion 20 in place on mounting plate portion 18, end 62 of detachable turnbuckle portion 20 will naturally drop and tend to hold detachable turnbuckle portion 20 in place on mounting plate portion 18 until turnbuckle is turned to move wing region 28 upwardly to lock aperture 30a. The inventor assumes that a turnbuckle will be used to cinch the camper to the truck. However, other means to move for cinching can be employed and the term "turnbuckle" is not meant as a term of limitation.

The locked position of detachable turnbuckle portion 20 on mounting plate portion 18 is shown in FIG. 7. In this locked position, the necks 54 will ride against terminal ends 64 of narrower ends of apertures 34 (as shown in FIG. 7).

Once a user wishes to remove the camper from the truck, all he or she needs to do is to turn the tumbuckles to allow the wing region 28 of detachable turnbuckle portion 20 to drop (as shown in FIG. 1), and then remove turnbuckle portion 20 from mounting plate portion 18. If desired, chain 24 can then be removed from aperture 26 on wing region 28 of detachable turnbuckle portion 20.

Once locked in place, the detachable anchor for campers 10 provides a very secure attachment for connecting a camper to a pickup truck with tumbuckles or otherwise. When detachable turnbuckle plate portion 20 is removed from mounting plate portion 18 (as shown in FIG. 2), the truck will not have any portions extending beyond the side wall of the bed.

In lieu of using protrusions 30 with enlarged heads 52 and narrower necks 54 on mounting plate portion 18 and corresponding apertures with wider ends 32 and narrower ends 34, other detachable attachment means can be provided. For example, as shown in FIGS. 8 and 9, instead of a protrusion with a distinct head and neck on the mounting plate portion, and an aperture with wider end and a narrower end, in alternate embodiment of detachable anchor for camper 80, mounting plate portion 82 can be provided with a bent L-shaped portion 84 formed together with mounting plate portion 82. Apertures (e.g. rectangular in shape) 86 can be formed in detachable turnbuckle plate portion 88. By moving a wing region 90 of detachable turnbuckle plate portion 88 up, bent L-shaped portions 84 will capture on a portion of the perimeter 92 of apertures 86 and detachably lock it in place. Other types of detachable attachment means can also be provided.

The drawings and the foregoing description are not intended to represent the only form of the invention in regard to the details of this construction and manner of operation. In fact, it will be evident to one skilled in the art that modifications and variations may be made without departing from the spirit and scope of the invention. Although specific terms have been employed, they are intended in a generic and descriptive sense only and not for the purpose of limitation, the scope of the invention being delineated in the following the claims which follow.

What is claimed is:

1. A detachable anchor in combination with a pickup truck for attaching a camper to the pickup truck the pickup truck having a bed and a cab, the bed having side walls and a front wall located between the cab and the bed, the detachable anchor comprising:

a mounting plate portion for attachment to the pickup truck, the mounting plate portion having first engagement means, wherein the mounting plate portion does not extend beyond the sidewalls of the bed; and a detachable turnbuckle portion having second engagement means, the second engagement means being adapted to detachably engage with the first engagement means, the detachable turnbuckle portion, wherein the mounting plate portion is attached to the front wall of the bed of the pickup truck, and wherein the detachable turnbuckle portion has a portion which extends beyond the sidewalls of the bed with means to attach to a cinching means for attachment to the camper.

2. The detachable anchor of claim 1, wherein the first engagement means on the mounting plate portion comprises a pair of protrusions with enlarged heads and narrower necks, and the second engagement means on the detachable turnbuckle portion comprises a pair of apertures with wider ends and narrower ends, wherein the wider ends of the apertures are adapted to receive the enlarged head and the narrower ends of the apertures are adapted to retain the heads.

3. The detachable anchor of claim 2, wherein a first aperture of the pair of apertures is positioned closer to portion of the detachable turnbuckle portion which extends beyond the sidewalls of the bed and is oriented such that its wider end faces upwardly, and wherein a second aperture of the pair of apertures is positioned distant to the portion of the detachable turnbuckle portion which extends beyond the sidewalls of the bed and is oriented such that its narrower end faces upwardly.

4. The detachable anchor of claim 1, wherein the mounting plate portion has threaded bolt holes formed therein, and further comprising a backing plate with holes formed therethrough in a pattern aligned with the threaded bolt holes formed in the mounting plate portion for attachment of the mounting plate portion to the front wall of the bed between the bed and the cab.

5. The detachable anchor of claim 1, wherein the detachable turnbuckle portion comprises a unitary structure formed from metal.

6. The detachable anchor of claim 1, wherein the portion of the detachable turnbuckle portion which extends beyond the sidewalls of the bed with means to attach to a cinching means for attachment to the camper comprises a wing region and the means to attach to a cinching means comprises an aperture in the wing region.

7. The detachable anchor of claim 1, wherein the cinching means comprises a turnbuckle.

\* \* \* \* \*